May 20, 1969  J. G. G. BAND  3,445,806
APPARATUS FOR PROVIDING A DIVER WITH DIRECTIONAL PERCEPTION
Filed Jan. 3, 1968
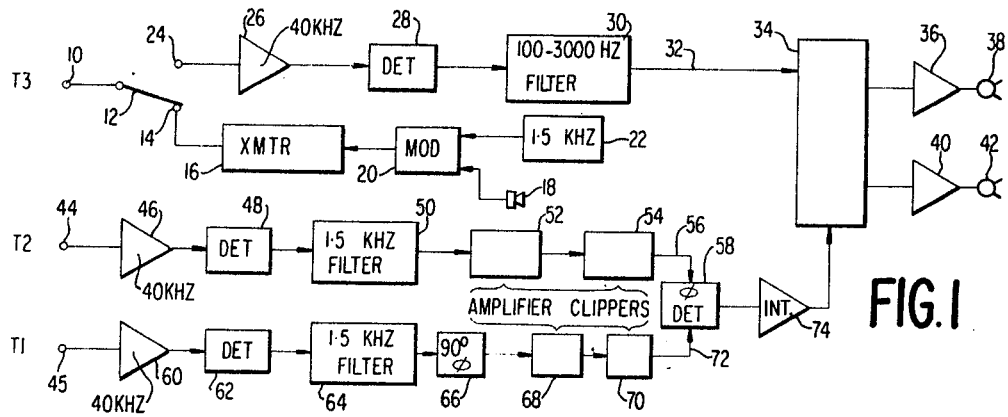
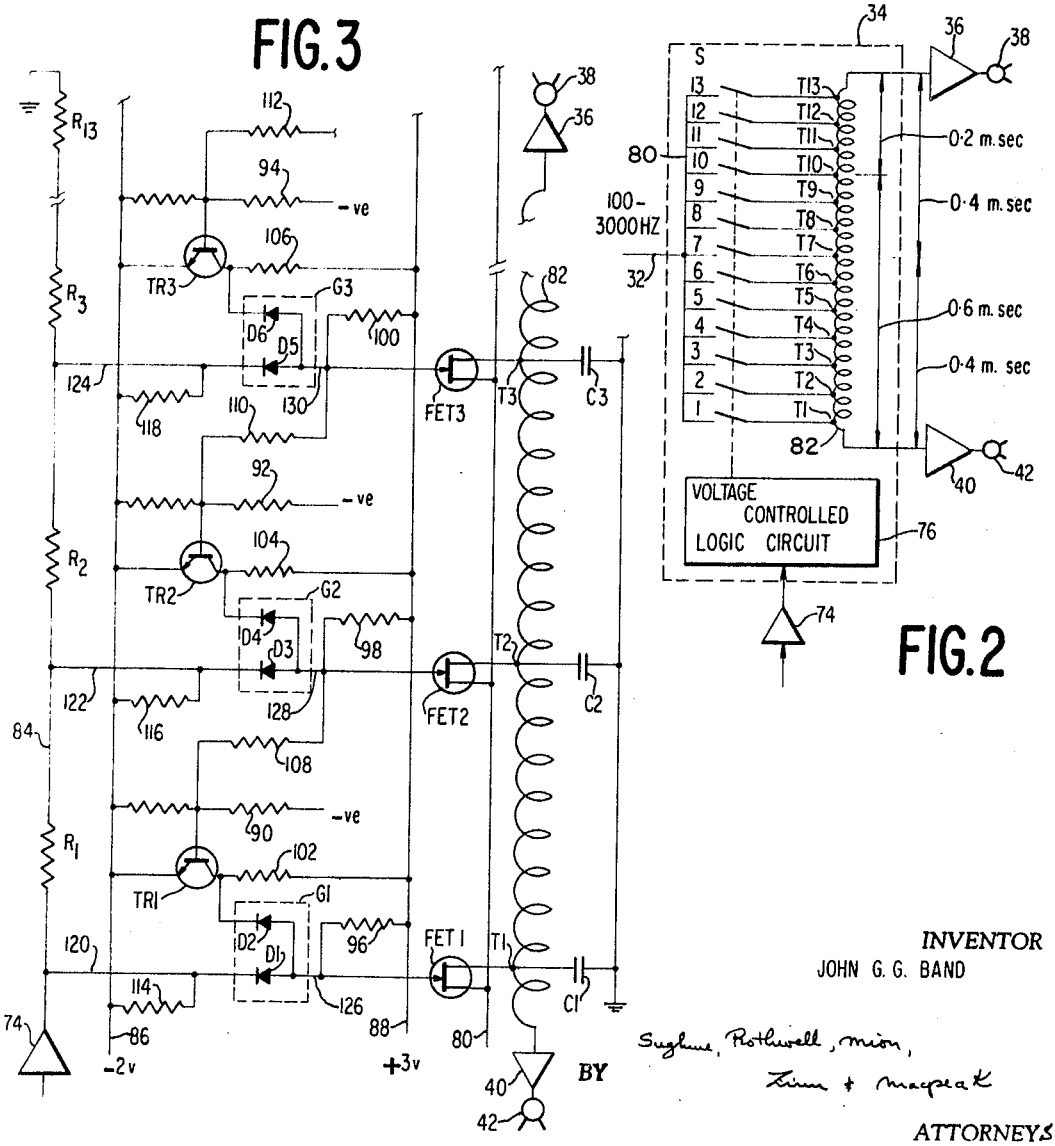
INVENTOR
JOHN G. G. BAND
ATTORNEYS

United States Patent Office 3,445,806
Patented May 20, 1969

3,445,806
APPARATUS FOR PROVIDING A DIVER WITH DIRECTIONAL PERCEPTION
John G. G. Band, North Miami Beach, Fla., assignor to Marine Acoustical Services, Inc., Miami, Fla.
Filed Jan. 3, 1968, Ser. No. 695,476
Int. Cl. H04b 13/00
U.S. Cl. 340—6         6 Claims

ABSTRACT OF THE DISCLOSURE

An underwater voice communication system which compensates for the difference in the speed of sound in water and in air so that a diver can perceive the true direction of an underwater sound wave. A remote 40 kHz. transmitter is modulated by both voice intelligence and a 1.5 kHz. tone. The diver's receiver detects the voice intelligence and applies it to a multiple tap delay line connected between the earphones in his helmet. The 1.5 kHz. pilot tone is separately detected by two spaced hydrophones to produce two electrical signals whose phase difference is used to generate a control voltage proportional to the difference between the times that the same point on the tone sound wave impinges upon the two hydrophones. The control voltage is applied to a voltage-controlled logic circuit which selects one of the taps on the delay line in accordance with the magnitude of the control voltage. The tap selected by the control voltage determines the relative phase shift and relative amplitude of the signals applied to the diver's two earphones. The relative phase and amplitude of the sound heard by the diver are thus corrected to the relative phase and amplitude which the diver would hear if the sound had traveled through air instead of water, thereby permitting the diver to perceive the true direction of the sound wave.

BACKGROUND OF THE INVENTION

Field of the invention

This invention is in the field of underwater sound communication systems.

Description of the prior art

Prior compensated underwater communication systems have employed the differencce in amplitude of the sound signals received at the transducers in an attempt to reconstruct the appropriate delay and amplitude difference which would be encountered if the sound had traveled through air. However, these prior art systems employ a fixed delay line and depend upon the relative amplitude of the delayed signal to provide an illusion of the proper variance in phase.

SUMMARY OF THE INVENTION

The present invention possesses all of the advantages of the prior art and none of the disadvantages. In accordance with the present invention, the determination of the direction of an acoustical energy radiating source in a medium other than air is obtained by detecting the difference in time or phase at which an acoustical signal impinges upon two spaced transducers at a receiver in the medium. This time difference is converted to a control signal which controls a variable delay device coupled between the transducers and a pair of earphones associated with the ears of a human. When an acoustical signal from the source is received at the receiver, it is converted to an electrical signal and applied to the delay device which then functions in response to the control signal to vary the relative phase of the electrical signals applied to the earphones so that the relative phase of the sound produced by the earphones is the same that would have been perceived if the acoustical signal had traveled through air rather than another medium.

DESCRIPTION OF THE DRAWINGS

FIGURE 1 is a schematic block diagram of a diver's underwater transceiver or communicator set;

FIGURE 2 is a schematic diagram illustrating the principle of operation of the sound direction compensating mechanism of the invention; and FIGURE 3 is a schematic circuit diagram showing the details of a preferred embodiment of a logic circuit and variable delay line forming part of the compensating mechanism.

BRIEF DESCRIPTION OF THE PREFERRED EMBODIMENT

In FIGURE 1 there is illustrated a block diagram of an underwater diver's communicator or transceiver set. A hydrophone 10 acts as a transducer to convert sound signals to electrical signals or electrical signals to sound signals. When the diver wishes to transmit, the transmit receive switch 12 is closed to contact 14 to connect a 40 kHz. transmitter 16 to the hydrophone. The diver speaks into a microphone 18 whose output is fed to a modulator 20 which modulates the 40 kHz. carrier of the transmitter 16 with voice intelligence in the range of 100 to 3000 Hz. Also connected to the input of the modulator is a 1.5 kHz. pilot tone generator 22. Consequently, when the diver is transmitting, both the speech intelligence and a 1.5 kHz. pilot tone modulate the 40 kHz. carrier which is converted by hydrophone 10 to an acoustical signal which is transmitted through the water.

When a diver wishes to receive an acoustical signal from another diver having the same type of transmitter, switch 12 is closed to contact 24 so that the received carrier including the voice intelligence and a 1.5 kHz. tone is amplified in a 40 kHz. tuned amplifier 26. The voice intelligence and the tone are removed from the carrier by a detector 28, and then the tone is removed by a sharply tuned notch filter 30 which blocks the 1.5 kHz. tone so that only the voice intelligence is fed along line 32 to a sound direction compensator 34 which has two outputs. One output is fed through an audio amplifier 36 to the right earphone 38 of the diver's headset, and the other output is fed through an audio amplifier 40 to the left earphone 42 of the headset.

When the diver's communicator set is in the receive mode, a pair of hydrophones or transducers 44 and 45 having a predetermined spacing also convert received acoustical signals to electrical signals. The output of transducer 44 is fed through a 40 kHz. tuned amplifier 46, detected by detector 48 and then fed through a 1.5 kHz. bandpass filter 50 which permits only the 1.5 kHz. tone to pass through a pair of amplifier clippers 52 and 54 to one input 56 of phase detecting coincidence circuit 58.

The output of the other transducer 45 is also fed through a 40 kHz. tuned amplifier 60, detected by detector 62 and then passed through a sharply tuned 1.5 kHz. bandpass filter 64. The output of filter 64 is passed through a 90° phase shifter 66 which introduces a 90° phase shift to the 1.5 kHz. pilot signal. The output of the phase shifter is fed through a pair of amplifier clippers 68 and 70 and then to the second input 72 of phase detector 58.

The output of phase detector 58 is a series of constant amplitude pulses whose widths are proportional to the difference in phase of the clipped waves applied to the inputs 56 and 72. These pulses are fed to an integrating amplifier 74 whose output is a DC control voltage whose amplitude is proportional to the width of the pulses on the output of the phase detector.

Transducers 44 and 45 have a predetermined spacing and are positioned in the diver's headset so that they sense a sound wave front from the same direction in which the diver is facing, so that the control voltage is proportional to the angle between the direction the diver is facing and the direction from which the sound is coming. If the diver is exactly facing the source of the sound, the wave front would have the same phase at both transducers 44 and 45, and the output of the integrating amplifier would be at its reference level. However, as the diver turns his head from the dead center position, the wave front will strike one of the transducers 44 and 45 before the other, i.e. the wave front will not be in phase at both of the transducers; therefore, the electrical signals produced by transducers 44 and 45 will be proportionately out of phase, and the control voltage will vary proportionately above or below the reference level, depending upon which way the head is turned.

The use of the pilot tone signal is an important feature of this invention. Because of the high velocity of sound in water and the high carrier frequency, a small motion of the diver's head results in a phase difference going through many times $2\pi$ radians, thereby making the carrier phase relationship useless in the determination of the angle of arrival of the acoustical signal.

FIGURE 2 illustrates the manner in which the sound which reaches the diver's ears is compensated in phase and amplitude so that the sound is heard as if it traveled through air rather than water, thereby permitting the diver to perceive the true direction of the sound. The audio output from the 100–3000 Hz. notch filter 30 is applied via the line 32 to a common bus 80 connected to one side of a plurality of switches S1, S2, . . . S12, S13. These switches are shown as mechanical switches, but in practice would be electronic switches as will be discussed below in connection with FIGURE 3. The movable arms of the switches are controlled by the output of a voltage controlled logic circuit 76 whose details will be described in connection with FIGURE 3. The input to the logic circuit is the DC control voltage from the integrating amplifier 74. The switch arms are connected to corresponding taps T1, T2, T3 . . . T12, T13 on a delay line 82. One end of the delay line is connected through audio amplifier 36 to the right earphone 38 of the driver's headset and the lower end of the delay line is connected to the audio amplifier 40 to the left earphone 42 of the driver's headset.

The output of the integrating amplifier 74 is a DC voltage proportional to the angle between the direction the diver is facing and the direction from which the sound wave front is coming toward the diver. This angle will be defined as 90° when the diver is looking directly at the source of the sound, 0° when the sound is coming from the left at 90° to the direction the diver is facing and 180° when the sound is coming from the right at a direction of 90° to which the diver is facing. This voltage actuates the voltage-controlled logic circuit 76 which closes the switch arm on only one of the switches S1–S13 to connect the audio output to only the corresponding one of the taps T1–T13 on relay line 82.

As illustrated in FIGURE 2, if the diver is directly facing the source of the sound wave, the logic circuit 76 will function to close switch S7 to apply the audio output from the receiver to tap T7 of the delay line, thereby introducing equal delays of 0.4 millisecond in the signals applied to the earphones 38 and 42. However, if the diver's head is now turned such that the sound comes from his right, i.e. at an angle between 90° and 180°, the voltage from the integrating amplifier 74 will increase so that the logic 76 will cause switch S10, for example to close so that only a 0.2 millisecond delay is introduced into the signal applied to the right phone 38, but a 0.6 millisecond delay is introduced into the left phone 42. If the direction of the sound is either 0 or 180°, one earphone will be fed directly with the audio signal whereas the other earphone will receive the audio signal after a delay of 0.8 millisecond, the total delay of the delay line 82.

In addition to this time or phase delay, the signal will also be attenuated by an amount determined by the total attenuation of all the sections of the delay line through which the signal passes. This attenuation may be varied by inserting matched resistive pads between delay line taps as required.

In this invention a monophonic or single intelligence signal channel is used, thereby avoiding the potential difficulties caused by phase and attenuation changes which would have to be dealt with if stereophonic or dual intelligence channels were used as is common in the prior art systems. Such amplitude or phase variations in the stereophonic systems are particularly undesirable since they are not proportional to the equivalent delays and amplitude differences observed in air. In the present invention, amplitude and phase differences appropriate to airborne sound received at the direction angle measured by the spaced transducers 44 and 45 and the phase detector 58 are accurately synthesized by the multiple section delay line 82, each section of which may be tailored both in attenuation and in phase shift. The apparent change of position of the underwater sound source corresponding to the actual change in the source's position may be made larger or smaller by merely adjusting the gain of the amplifier clippers 52, 54, and 68, 70 which control the magnitude of the pulses produced by the phase detector 72, which pulses in turn are integrated by the amplifier 74 and applied to the voltage-controlled logic circuit 76. If it is found that the apparent angular shift of a sound source between two adjacent taps of the delay line 82 is greater or less than the desired increment, the delay line segment between the two taps may be replaced with another of the same characteristic impedance but having a different delay or attenuation.

FIGURE 3 is a schematic circuit diagram of a preferred embodiment of the voltage-controlled logic circuit 76 and the delay line 82 illustrated in FIGURE 2. Only the first three taps T1, T2 and T3 of the delay line are shown, but it is understood that the delay line can be expanded to include all thirteen taps, as shown in FIGURE 2, or any other number of taps as desired. The portion of the delay line between any pair of adjacent taps will be called a segment of the delay line.

The DC control voltage from the integrating amplifier 74 is applied across a voltage divider 84 consisting of equal resistors R1, R2, R3 . . . R13. The audio signal from the notch filter 30 is applied to the bus 80. A plurality of field effect transistors are connected between the bus 80 and the corresponding taps on delay line 82. The source electrode of each transistor is connected to the bus 80 and the drain electrode is connected to the tap on the delay line. As shown in FIGURE 3, the three FET transistors FET1, FET2, and FET3 are connected between taps T1, T2, T3, respectively and the bus 80.

A conductor 86 is connected to a source of −2 volts DC and a bus 88 is connected to a source of +3 volts DC. Connected between these two conductors are three NPN transistors TR1, TR2, and TR3 corresponding to the delay line taps T1, T2 and T3, respectively. These transistors function as inverters. A suitable base bias voltage is applied to the base electrode of each of the transistors via respective voltage dividers 90, 92 and 94 connected between conductor 86 and a suitable supply of negative potential $-v_e$.

AND gates G1, G2 and G3 . . . G13 are connected between the collector electrodes of the respective inverter transistors, and the gate electrodes of the corresponding field effect transistors. The output leads of the gates G1, G2 and G3 are identified as 126, 128 and 130, respectively. Each of the AND gates consists of two diodes: one connected between the gate output lead and, via a corresponding one of conductors 120, 122 or 124, a point on the voltage divider 84 corresponding to one of the delay line tapes; and the other connected between the gate output lead and the collector electrode of the inverter transistor corresponding to the same delay line tap. The output of each AND gate is connected through a corresponding one of the resistors 96, 98 and 100 to the conductor 88 tied to the +3 voltage supply. The output of each AND gate is also connected to the gate electrode of the corresponding FET.

Each of the inverter transistors TR1, TR2 and TR3 also has a corresponding load resistor 102, 104 or 106 connected between its collector electrode and conductor 88. The base electrode of each of the inverter transistors is connected through a corresponding resistor 108, 110 or 112 to the output of the AND gate G2, G3 . . . or G13 associated with the next high ordered tap T2, T3 . . . or T13 on the delay line 82. The −2 volt bias is also applied via respective resistor 114, 116 and 118 to the lower inputs of the AND gates G1, G2 and G3, i.e. to the cathodes of diodes D1, D3 and D5. The collector outputs of the inverter transistors TR1, TR2 and TR3 are connected to the upper inputs of the AND gates G1, G2 and G3, respectively, i.e. to the cathodes of the diodes D2, D4 and D6.

In operation, consider an increasingly positive voltage from the output of the integrating amplifier 74 applied to the lower end of voltage divider 84. The full value of this voltage will appear at the lower end of resistor R1 and proportionately smaller voltages will appear between adjacent pairs of the resistors R1, R2, R3 . . . R13, the upper end of R13 being connected to ground. Inverter transistors TR1, TR2 and TR3 are initially non-conducting by virtue of the reverse base-emitter bias voltage provided by the voltage dividers, 90, 92 and 94 connected between $-v_e$ and bias conductor 86.

Diodes D1, D3 and D5 are initially forward-biased and conducting since their anodes are connected to conductor 88 at +3 volts and their cathodes are connected to conductor 86 at −2 volts. However, since the inverter transistors TR1, TR2 and TR3 are nonconducting, the diodes D2, D4 and D6 are also initially non-conducting. The cathodes of diodes D1, D3 and D5 are also connected via conductors 120, 122 and 124, respectively, to voltage divider 84. Consequently, as the DC control voltage of the output of integrating amplifier 74 rises, it reaches a level at which diode D1 becomes back-biased and therefore switches off. Consequently, the output lead 126 of AND gate G1 rises toward +3 volts, thereby switching on the field effect transistor FET1 and permitting the audio intelligence signal applied to conductor 80 to flow into the source electrode and out of the drain electrode of FET1 to tap T1 on delay line 82. Consequently, the audio signal is fed with minimum delay and attenuation through amplifier 40 to the left earphone 42 and with maximum delay and attenuation through delay line 82 through amplifier 36 to the right earphone 38. Therefore, tap T1 corresponds to a sound direction of approximately 0°, i.e., the sound is coming from the diver's left.

As the DC voltage output of amplifier 74 increases further, diode D3 becomes back-biased to cause the output lead 128 of AND gate G2 to rise towards +3 volts, thereby turning on field effect transistor FET2 and permitting the audio signal on bus 80 to be fed to tap T2 on delay line 82. However, since the base electrode of inverter transistor TR1 is connected through resistor 108 to the output lead 128, the higher voltage level on the output lead forward-biases transistor TR1, thereby turning it on. Consequently, diode D2 becomes forward-biased to form a current path between conductors 88 and 86 via resistor 96, diode D2 and transistor TR1. This current flow drops the voltage of output lead 126 to its initial value so that diode D1 is again reverse-biased and thereby switched off. Since the gate electrode of field effect transistor FET1 is also connected to output lead 126, FET1 is switched off so that only FET2 is conducting and all the audio signal is applied to the tap T2 of the delay line. This same action occurs at each stage as the DC control voltage on the output of amplifier 74 increases and successively back-biases the lower diodes in the AND gates G1, G2, G3 . . . G13.

Let us assume that FET2 is now conducting and all the other field effect transistors are switched off, and the output of amplifier 74 drops to the level which initially switched on FET1. When this happens, diode D3 will become forward-biased and conducting, thereby reducing the voltage on output lead 128 of AND gate G2 to such a level that FET2 is switched off. The reduced voltage level on output lead 128 causes transistor TR1 to turn off, thereby rendering diode D2 non-conducting and causing the voltage of the output lead 126 of AND gate G1 to again rise to +3 volts. Of course, diode D1 still remains reverse-biased because of the positive voltage from integrating amplifier 74 applied to its cathode via the lead 120. However, the high voltage level on output lead 126 switches on transistor FET1 so that the audio signal is again applied to tap T1. Capacitors C1, C2, C3 . . . C13 are connected to corresponding delay line taps to shunt to ground switching transients and other undersired high frequency signals.

There has been described an extremely flexible sound direction compensating system for simulating the phase shift and attenuation which would be heard by a human in an air medium. An accurate electronic measurement is made of the angle arrival of the sound signal. This measurement can be made to an accuracy much greater than a human can make in an air medium. The DC control voltage which is used to position the audio intelligence signal input to the delay line could also be used to operate a meter which would accurately indicate the azimuth of a sound source with respect to the direction in which the diver is facing.

While the invention has been particularly shown and described with reference to a preferred embodiment thereof, it will be understood by those skilled in the art that various changes in form and details may be made without departing from the spirit and scope of the invention.

What is claimed is:

1. A compensated sound direction finding system for enabling a human in a medium other than air to perceive the true direction of a sound wave emanating from a remote point and traveling through said medium toward him comprising:
  (a) spaced first and second transducer means for converting a portion of the sound wave to first and second electrical signals respectively,
  (b) third transducer means for converting the sound wave to a third electrical signal,
  (c) fourth and fifth transducer means respectively associated with the two ears of the human for converting said third electrical signal to first and second acoustical signals,
  (d) phase detecting means for producing a control signal having a parameter which is dependent upon the relative phase of said first and second electrical signals, and
  (e) means responsive to said control signal for controlling the relative phase of said third electrical signal applied to said fourth and fifth transducer means so that the relative phase of said acoustical signals perceived by the human is the same as if the sound wave had traveled through air.

2. A compensated sound direction finding system as defined in claim 1 wherein said controlling means further comprises means for controlling the relative amplitude of the electrical signals so that the relative amplitude of said acoustical signals is the same as if the sound wave had traveled through air.

3. A compensated sound direction finding system as defined in claim 2 wherein said controlling means comprises:
  (a) a delay line having a plurality of taps between the ends thereof, (b) means connecting said delay line between said fourth and fifth transducers, and (c) logic circuit means responsive to said control signal for coupling said third electrical signal to one of said taps.

4. A compensated sound direction finding system as defined in claim 3 wherein:

(a) said control signal is a control voltage proportional to the difference in phase between said first and second electrical signals, and said logic circuit means comprises:

(b) a voltage divider, (c) means for applying said control voltage to one end of said voltage divider, and (d) a plurality of normally open, voltage responsive switch means each connected betwen one of said taps and a different point on said voltage divider, whereby a different one of said switch means is closed at different magnitudes of said control voltage, and (e) means for applying said third electrical signal to said plurality of switch means so that said third electrical signal passes through the closed switch means to the tap connected to said closed switch means.

5. A compensated sound direction finding system as defined in claim 4 wherein each switch means comprises a field effect transistor.

6. A compensated sound direction finding system as defined in claim 4 wherein:

(a) said switch means are successively closed as the level of said control voltage increases through said different magnitudes, and (b) means connected between each pair of adjacent switch means and responsive to a voltage magnitude which closes one switch means to open the switch means which had been closed by the next lower voltage magnitude.

References Cited

UNITED STATES PATENTS

| | | | |
|---|---|---|---|
| 3,181,116 | 4/1965 | Gordon | 340—5 |
| 3,286,782 | 11/1966 | Batteau | 181—0.5 |
| 3,296,582 | 1/1967 | Ide | 340—6 X |

RICHARD A. FARLEY, *Primary Examiner.*

U.S. Cl. X.R.

181—5

PO-1050
(5/69)

UNITED STATES PATENT OFFICE
CERTIFICATE OF CORRECTION

Patent No. 3,445,806      Dated May 20, 1969

Inventor(s) John G. G. Band

It is certified that error appears in the above-identified patent and that said Letters Patent are hereby corrected as shown below:

IN THE SPECIFICATION

Column 1, line 46  -  "differencce" should be "difference"
Column 5, line 1   -  "tapes" should be "taps"

IN THE CLAIMS

Column 7, line 16 (d of Claim 4)  -  "betwen" should be "between"

SIGNED AND
SEALED

SEP 2 - 1969

(SEAL)
Attest:

Edward M. Fletcher, Jr.
Attesting Officer

WILLIAM E. SCHUYLER, JR.
Commissioner of Patents